July 13, 1948. S. B. HASELTINE 2,444,989
FRICTION SHOCK ABSORBER
Filed Feb. 4, 1944 2 Sheets-Sheet 1
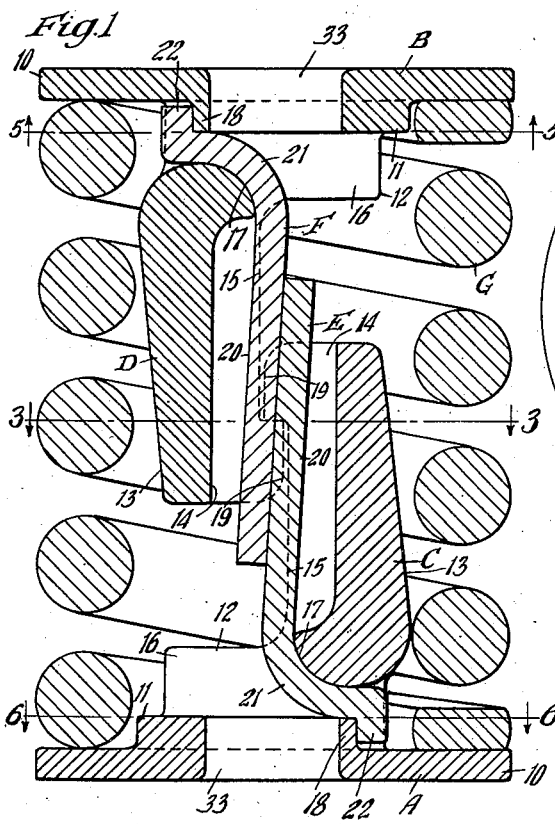
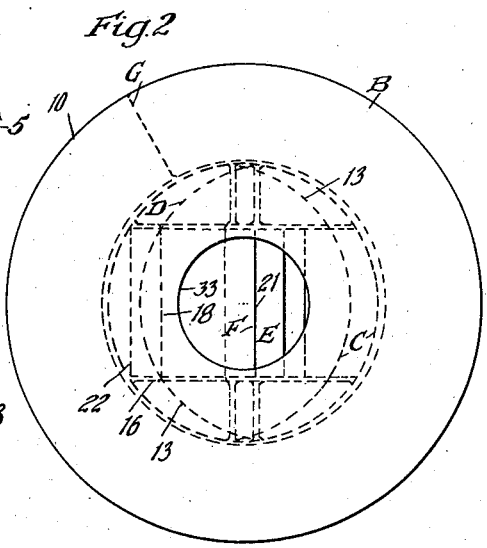
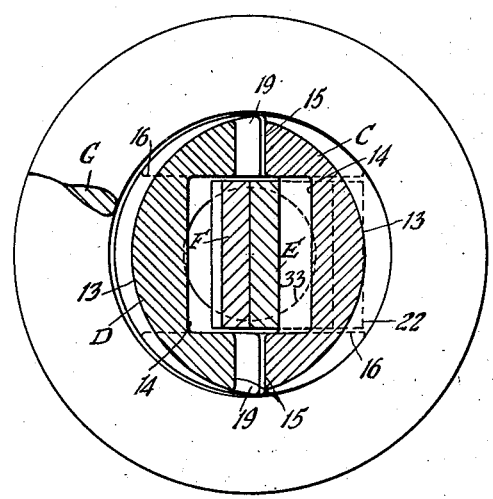
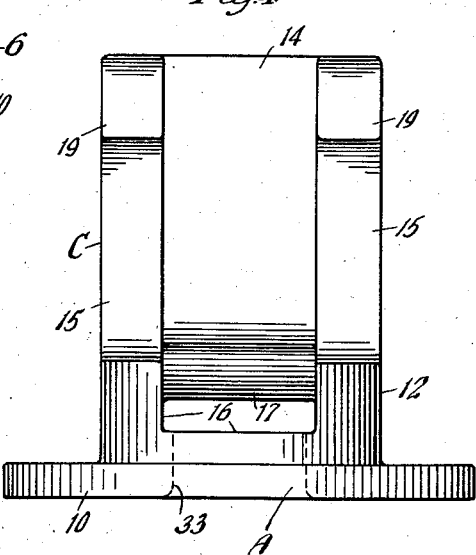
Inventor
Stacy B. Haseltine
By Henry Fuchs
Atty.

July 13, 1948.  S. B. HASELTINE  2,444,989
FRICTION SHOCK ABSORBER
Filed Feb. 4, 1944  2 Sheets-Sheet 2
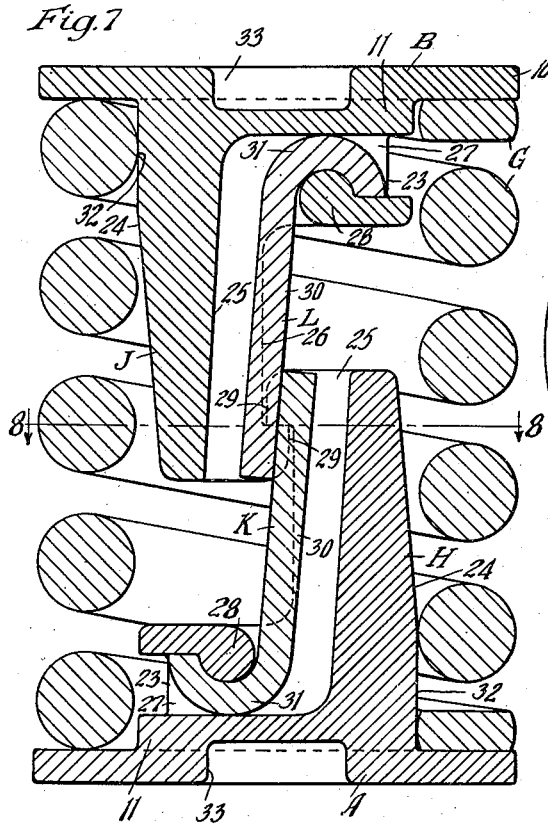
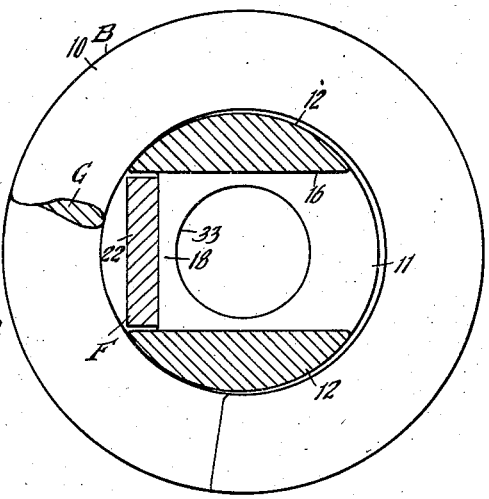
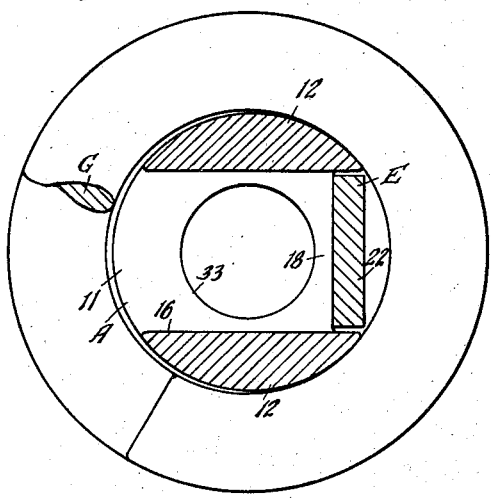
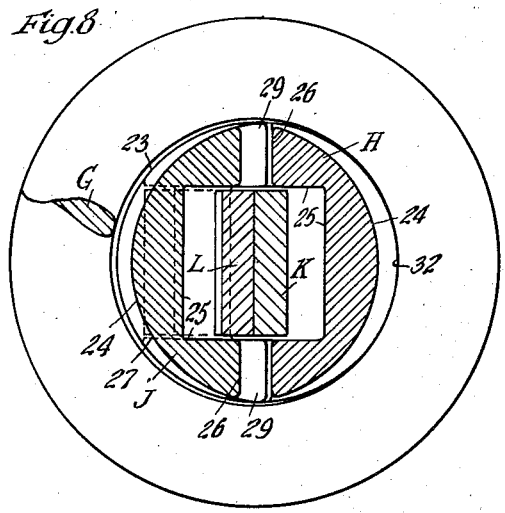
Inventor
Stacy B. Haseltine
By Henry Fuchs
Atty.

Patented July 13, 1948

2,444,989

UNITED STATES PATENT OFFICE 2,444,989

FRICTION SHOCK ABSORBER

Stacy B. Haseltine, La Grange, Ill., assignor to W. H. Miner, Inc., Chicago, Ill., a corporation of Delaware Application February 4, 1944, Serial No. 521,024

6 Claims. (Cl. 267—9)

This invention relates to improvements in friction shock absorbers, especially adapted for use in connection with truck springs of railway cars for snubbing the action of the springs.

One object of the invention is to provide a friction shock absorber comprising relatively slidable friction spring plates held in frictional contact by their spring action.

A further object of the invention is to provide a mechanism, as set forth in the proceding paragraph, wherein relative sliding movement of the spring plates is resisted by a coil spring which also yieldingly maintains the frictional contact between said plates.

A still further object of the invention is to provide a shock absorber of the character described, wherein the friction spring plates are inclined to the vertical, whereby the pressure between the contacting friction surfaces of the plates is progressively increased during compression of the mechanism.

In the drawings forming a part of this specification, Figure 1 is a central, transverse, vertical sectional view of my improved shock absorber. Figure 2 is a top plan view of Figure 1. Figure 3 is a transverse, horizontal sectional view, corresponding substantially to the line 3—3 of Figure 1. Figure 4 is an elevational view of the lower post member of the improved shock absorber, looking from left to right in Figure 1. Figures 5 and 6 are transverse, horizontal sectional views, corresponding respectively to the line 5—5 and 6—6 of Figure 1. Figure 7 is a view, similar to Figure 1, illustrating another embodiment of the invention. Figure 8 is a transverse, horizontal sectional view, corresponding substantially to the line 8—8 of Figure 7.

Referring first to the embodiment of the invention illustrated in Figures 1 to 6 inclusive, my improved shock absorber comprises broadly a pair of relatively movable followers A and B; a pair of posts C and D integral with said followers; a pair of friction spring plates E and F; and a coil spring resistance G.

The followers A and B are of identical design, the follower A being disposed at the bottom and the follower B at the top of the mechanism. Each follower is in the form of a disclike plate having a laterally projecting, annular, peripheral flange 10 of lesser thickness than the central portion thereof, which is in the form of a boss 11. The boss 11 of the lower follower A is upstanding while that of the follower B is depending, that is, the upper follower B is inverted with respect to the follower A. As shown in the drawings, the boss 11 of each follower is substantially cylindrical.

The posts C and D are of identical design, each post having a transverse base portion 12, extending from the boss 11 of the corresponding follower and formed integral therewith. Each post has a transversely curved, outer surface 13, which slopes inwardly toward the outer end of the post. On the inner side, each post is cut out in lengthwise direction providing a longitudinally extending, relatively wide groove or slot 14 of angular cross section. At opposite sides of the slot 14, the inner side of the post presents lengthwise extending, flat faces 15—15. As shown clearly in Figure 1, the posts C and D are disposed at opposite sides of the vertical center of the mechanism with the base portions 12—12 thereof projecting laterally inwardly therefrom. The base portion 12 of each post is transversely slotted, as indicated at 16, said slot opening into the slot 14 of the post and forming a continuation thereof. The posts C and D are reversely arranged, that is, inverted with respect to each other and have the inner sides facing each other with the flat faces 15—15 and 15—15 thereof opposed. The slot 16 of each post is contracted toward the outer side of the post, as clearly shown in Figure 1, the wall of said contracted portion, remote from the base, being rounded, as indicated at 17, said rounded wall being the upper wall of the slot 16 of the post C and the lower wall of the slot 16 of the post D. At the outer side of each post, the slot 16 is enlarged to provide a vertical shoulder 18 opposed to the rounded wall 17.

At the outer end, on the inner side thereof, each post has inwardly projecting, offset portions 19—19, projecting from the faces 15—15, forming lugs or hook members, presenting transverse stop shoulders, the lugs 19—19 of the post D being engaged underneath the lugs 19—19 of the post C to limit relative longitudinal separation of the posts and hold the mechansm assembled.

The friction plates E and F are also of identical design, said plates being preferably spring steel. Each plate comprises an elongated, straight, main body portion 20 having a curved section 21 at one end, terminating in an angular hook 22. The plates E and F are respectively carried by the posts C and D, the plate E upstanding from the follower A and the plate F depending from the follower B. Each plate is secured to its post by having the curved portion 21 thereof extending into the slot 16 of the base 12 with the hook 22 engaged over the shoulder 18 and the concave side of the curved section 21 bearing on the rounded wall 17, the main body portion of the plate being disposed within the slot 14 of the post.

The spring friction plates E and F are in face to face contact with each other and flexed outwardly, in the assembled condition of the mechanism, thus being inclined with respect to the central, vertical axis of the mechanism. Inasmuch as these plates are under tension, their inherent resiliency presses the contacting friction surfaces thereof into close engagement with each other to produce the desired frictional resistance.

The spring G, which comprises a relatively heavy, single coil, surrounds the posts C and D and bears at its top and bottom ends on the followers B and A, respectively. The spring G is preferably under initial compression and yieldingly resists relative approach of the followers B and A. In addition to opposing relative movement of the followers, the spring G also resists relative lateral displacement of the same, due to its yielding opposition to being canted, the inner side of the end coil at the lower end of the spring, as seen in Figure 6, bearing on the vertical wall of the boss 11 of the lower follower A at the right hand side of the mechanism, and the inner side of the end coil at the upper end of the spring bearing on the vertical wall of the boss 11 of the upper follower B at the left hand side of the mechanism, as shown in Figure 5.

In assembling the mechanism, the posts C and D in slightly tilted position so that the lugs 19—19 and 19—19 will pass each other, are inserted within the spring G, and the entire mechanism compressed, thereby forcing the lugs 19—19 and 19—19 of the posts past each other until they snap into engagement to lock the parts together.

Referring next to the embodiment of the invention illustrated in Figures 7 and 8, the construction is substantially the same as that shown in Figures 1 to 6 inclusive, with the exception that the friction spring plates are mounted in a different manner.

The improved shock absorbing mechanism, illustrated in Figures 7 and 8, comprises broadly a pair of followers identical with the followers A and B, hereinbefore described, and also indicated by A and B; a pair of friction posts H and J integral with said followers; a pair of friction spring plates K and L; and a coil spring which is identical with the spring G, hereinbefore described, and also indicated by G.

The posts H and J are of identical design, each post having a transverse base portion 23 extending from the boss 11 of the corresponding follower and formed integral therewith. Each post has a transversely curved, outer surface 24, which slopes inwardly toward the outer end of the post. On the inner side, each post is cut out lengthwise, providing a longitudinally extending, relatively wide groove or slot 25 of angular cross section. At opposite sides of the slot 25, the inner side of the post presents lengthwise extending, flat faces—26—26. As shown in Figure 7, the posts H and J are disposed at opposite sides of the vertical, central axis of the mechanism with the base portions 23—23 thereof projecting laterally inwardly therefrom. The base portion 23 of each post is provided with a transverse opening 27 communicating with the slot 25 and forming a continuation of the opening provided by said slot. The posts H and J are reversely arranged, that is, inverted with respect to each other, and have the inner sides facing each other, with the flat faces 26—26 and 26—26 thereof opposed.

The opening 27 has the wall thereof remote from the follower formed with a rounded projection 28 where the opening merges with the slot 25, said rounded projection being on the upper wall of the opening 27 of the post H and on the lower wall of the opening of the post J.

At the outer end, on the inner side thereof, each post has inwardly projecting, offset portions 29—29 projecting from the surfaces 26—26, forming lugs or hook members presenting transverse stop shoulders, the lugs 29—29 of the post J being engaged underneath the lugs 29—29 of the post H to limit relative longitudinal separation of the posts and hold the mechanism assembled.

The friction plates K and L are also of identical design, said plates being preferably spring steel. Each plate comprises an elongated, substantially straight, main body portion 30 having a curved hooklike inner end section 31. The plates K and L are respectively carried by the posts H and J, the plate K upstanding from the follower A and the plate L depending from the follower B. Each plate is secured to the corresponding post by having the hook 31 thereof extending into the opening 27 of the base 23 and engaged over the projection 28 with the flat edge of the plate at the extremity of the hook bearing on the adjacent flat wall of said opening, the end of the hook 31 of the upper plate L bearing on the bottom wall of the opening 27 of the upper post J and the end of the hook 31 of the lower plate K bearing on the top wall of the opening 27 of the lower post H. The rounded outer side of each hook 31 bears on the opposed wall of the opening 27, thus anchoring the plate against movement in vertical direction with respect to the post. The main body portion 30 of the plate is accommodated in the vertical slot 25 of the corresponding post.

The spring friction plates K and L are in face to face contact with each other and flexed away from the vertical, central axis of the mechanism, in the assembled condition of the parts, thus being inclined to the vertical. Inasmuch as these plates are under tension, their inherent resiliency presses the contacting friction surfaces thereof into close engagement with each other to produce the desired frictional resistance.

The spring G, which is identical with the spring G hereinbefore described, surrounds the posts H and J and bears at its top and bottom ends on the followers B and A, respectively, and opposes relative movement of the posts and friction spring plates. In addition to opposing relative movement of the followers, the spring G also resists relative lateral displacement of the posts, due to its yielding opposition to being canted, the inner side of the end coil at the lower end of the spring, as seen in Figure 7, bearing on the vertical wall portion 32 at the lower end of the post H at the right hand side of the mechanism, and the inner side of the end coil at the upper end of the spring bearing on the vertical wall portion 32 at the upper end of the post J at the left hand side of the mechanism.

The improved shock absorber, illustrated in Figures 1 to 6 inclusive and Figures 7 and 8, preferably replaces one of the spring units of a truck spring cluster; however, several of these improved shock absorbers may be employed in a single cluster of springs, replacing two or more units of the same.

As will be evident to those skilled in this art, the improved shock absorber is interposed between the top and bottom spring follower plates of the truck spring cluster and is compressed therebetween as the plates approach each other in service. To accommodate the shock absorber for use with spring follower plates having the usual spring centering projections, the top and bottom followers of both forms of the invention are provided with seats 33—33 receiving said projections.

The operation of the improved shock absorber illustrated in Figures 1 to 6 inclusive is as follows: Upon the spring cluster of the truck of a railway car being compressed between the spring follower plates of said cluster, the improved shock absorber is compressed therewith between said follower plates, forcing the followers A and B, the posts C and D, and the spring plates E and F toward each other, lengthwise of the mechanism against the resistance of the spring G, thereby effecting relative sliding movement between said spring plates on their friction surfaces. Inasmuch as the friction spring plates E and F are inclined to the vertical, a wedging action is produced during compression of the mechanism, further flexing the plates and tending to force the end followers laterally in opposite directions with respect to the central vertical axis of the mechanism. This action is yieldingly resisted by the opposition of the spring G to being canted, lateral pressure of the inner sides of the top and bottom end coils of the spring yieldingly pressing the followers laterally inwardly and the friction spring plates against each other. Progressively increasing frictional resistance is thus provided during compression of the mechanism to effectively snub the action of the truck springs.

As the spring follower plates of the truck springs are separated, due to recoil of the springs, the followers A and B and the friction spring plates E and F are moved apart lengthwise by expansive action of the spring G, thereby restoring the parts to the normal release position shown in Figure 1, lengthwise separation of the followers A and B being limited by shouldered engagement of the lugs 19—19 and 19—19 of the posts C and D with each other, thereby limiting expansion of the mechanism. As will be evident, snubbing of the truck springs is also effected during the recoil action of said springs, due to the frictional resstance provided by the interengaging friction spring plates of the shock absorber, which are held together by their inherent spring action.

The operation of the shock absorber illustrated in Figures 7 and 8 is substantially the same as the operation hereinbefore described in connection with the device shown in Figures 1 to 6 inclusive.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a pair of relatively movable end followers; of relatively lengthwise movable friction spring plates inclined to the longitudinal axis of the mechanism and having sliding engagement with each other, said plates being rigidly fixed to said followers respectively and being flexed to place the same under tension; and lengthwise extending coil spring means having its opposite ends bearing on said followers to oppose relative movement of said followers together with said plates toward each other, the coils of said spring means at opposite ends thereof having lateral bearing engagement with said followers respectively at opposite sides of the device to resist relative displacement of said followers laterally in opposite directions and oppose lateral separation of said spring plates.

2. In a friction shock absorber, the combination with a pair of relatively movable end followers; of posts on said followers; friction spring plates rigidly anchored to said followers respectively and bearing on said posts and having lengthwise sliding engagement with each other, said plates being inclined with respect to the longitudinal axis of the mechanism; and a coil spring surrounding said friction plates and posts and bearing at opposite ends on said followers and yieldingly resisting relative lateral displacement of said followers.

3. In a friction shock absorber, the combination with a pair of relatively movable end followers; of posts on said followers; friction spring plates rigidly anchored to said followers respectively and bearing on said posts and having lengthwise sliding engagement with each other, said plates being inclined with respect to the longitudinal axis of the mechanism; a coil spring surrounding said friction plates and bearing at opposite ends on said followers; and spring abutments on said followers respectively, said abutments being respectively at opposite sides of the mechanism and engaging the spring interiorly at opposite ends at corresponding sides of the mechanism to yieldingly hold said followers against relative lateral displacement.

4. In a friction shock absorber, the combination with a pair of top and bottom followers movable respectively toward each other lengthwise of the mechanism; of a pair of upper and lower, relatively lengthwise movable friction spring plates in sliding contact with each other, said upper plate being rigidly anchored at its upper end to said top follower for movement in unison therewith, said lower plate being rigidly anchored at its lower end to said lower follower for movement in unison therewith, said plates being inclined to the vertical and flexed and under tension; a coil spring surrounding said plates and bearing at opposite ends on said top and bottom followers; and abutment means on said top and bottom followers at opposite sides of said followers respectively engaged with the corresponding inner sides of the coils at the top and bottom ends of said spring.

5. In a friction shock absorber, the combination with a pair of top and bottom followers relatively movable toward each other lengthwise of the mechanism; of a pair of upper and lower posts rigid with said followers; interengaging lugs on said posts limiting lengthwise separation thereof; upper and lower, relatively lengthwise movable friction spring plates in sliding engagement with each other, said upper plate being rigidly anchored at its upper end to said upper post, said lower plate being rigidly anchored at its lower end to said lower post, said plates being flexed and under tension; and a coil spring surrounding said plates and bearing at its top and bottom ends on said top and bottom followers.

6. In a friction shock absorber, the combination with a pair of friction spring plates having lengthwise sliding engagement with each other on oppositely facing, inclined friction surfaces; of a lengthwise extending coil spring surrounding said plates; and a pair of followers at opposite ends of the mechanism bearing respectively on the opposite ends of said spring, one of said followers being rigidly anchored to the outer end of one of said plates and the other of said followers being rigidly anchored to the outer end of the other of said plates, each follower having an abutment shoulder thereon at one side thereof facing laterally in a direction opposite to the direction in which the friction surface of the plate which is anchored thereto faces, said shoulders of said followers being respectively at opposite sides of the mechanism and bearing on the corresponding inner sides of the coils of the spring at opposite ends respectively of said casing.

STACY B. HASELTINE.

REFERENCES CITED

The following references are of record in the file of this patent:

UNITED STATES PATENTS

| Number | Name | Date |
|---|---|---|
| 207,020 | Dick et al. | Aug. 13, 1878 |
| 488,474 | Gibbs | Dec. 20, 1892 |
| 709,999 | McCord | Sept. 30, 1902 |
| 757,781 | Shea | Apr. 19, 1904 |
| 1,140,101 | Bauer | May 18, 1915 |
| 1,859,703 | Holland | May 24, 1932 |
| 1,938,715 | Miner | Dec. 12, 1933 |
| 2,410,160 | Haseltine | Oct. 29, 1946 |
| 2,410,165 | Johnson et al. | Oct. 29, 1946 |